(12) United States Patent
Baldwin

(10) Patent No.: US 11,676,176 B2
(45) Date of Patent: *Jun. 13, 2023

(54) METHOD AND APPARATUS FOR ADJUSTING A DIGITAL ASSISTANT PERSONA

(71) Applicant: AT&T Intellectual Property I, L.P., Atlanta, GA (US)

(72) Inventor: Christopher Baldwin, Algonquin, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/546,531

(22) Filed: Dec. 9, 2021

(65) Prior Publication Data

US 2022/0101382 A1 Mar. 31, 2022

Related U.S. Application Data

(63) Continuation of application No. 16/405,137, filed on May 7, 2019, now Pat. No. 11,227,312, which is a (Continued)

(51) Int. Cl.
*G06Q 30/00* (2023.01)
*G06Q 30/0251* (2023.01)
(Continued)

(52) U.S. Cl.
CPC ..... *G06Q 30/0267* (2013.01); *G06Q 30/0269* (2013.01); *G06Q 30/0277* (2013.01); *H04W 8/18* (2013.01); *H04W 4/02* (2013.01)

(58) Field of Classification Search
CPC . G06Q 30/02–0277; H04W 4/02; H04W 8/18
See application file for complete search history.

(56) References Cited

U.S. PATENT DOCUMENTS

| 6,032,129 A | 2/2000 | Greef et al. |
| 6,035,283 A | 3/2000 | Rofrano |

(Continued)

FOREIGN PATENT DOCUMENTS

| EP | 2207164 A2 | 7/2010 |
| WO | 199957900 | 11/1999 |

(Continued)

OTHER PUBLICATIONS

Good, Nathaniel et al., "Combining Collaborative Filtering with Personal Agents for Better Recommendations", AAAI, 1999.

(Continued)

*Primary Examiner* — Raquel Alvarez
(74) *Attorney, Agent, or Firm* — Guntin & Gust, PLC; Robert Gingher

(57) ABSTRACT

A method that incorporates the subject disclosure may include, for example, providing a first digital assistant to engage in a first communication exchange with a user of the first communication device where the first digital assistant has a first digital assistant persona that controls information provided by the first digital assistant during communication exchanges, analyzing user input during the first communication exchange, and adjusting the first digital assistant persona based on one or more of the user persona, user deficiency, or promotional offers. Other embodiments are disclosed.

20 Claims, 6 Drawing Sheets

Related U.S. Application Data continuation of application No. 14/076,306, filed on Nov. 11, 2013, now Pat. No. 10,311,482.

(51) Int. Cl.
*H04W 8/18* (2009.01)
*G06Q 30/0241* (2023.01)
*H04W 4/02* (2018.01)

(56) References Cited

U.S. PATENT DOCUMENTS

| | | |
|---|---|---|
| 6,244,873 B1 | 6/2001 | Hill et al. |
| 6,606,744 B1 | 8/2003 | Mikurak |
| 6,735,632 B1 | 5/2004 | Kiraly et al. |
| 7,596,269 B2 | 9/2009 | King et al. |
| 7,613,692 B2 | 11/2009 | Hamilton et al. |
| 7,725,419 B2 | 5/2010 | Lee et al. |
| 7,814,041 B2 | 10/2010 | Caporale et al. |
| 8,037,150 B2 | 10/2011 | Weaver et al. |
| 8,063,905 B2 | 11/2011 | Brown et al. |
| 8,078,698 B2 | 12/2011 | Moore |
| 8,156,060 B2 | 4/2012 | Borzestowski et al. |
| 8,469,713 B2 | 6/2013 | Kron et al. |
| 8,498,628 B2 | 7/2013 | Shapiro et al. |
| 9,152,984 B1 | 10/2015 | Schoettler |
| 9,276,761 B2 | 3/2016 | Mukerji, III et al. |
| 9,805,493 B2 | 10/2017 | Crutchfield, Jr. et al. |
| 9,811,935 B2 | 11/2017 | Filev et al. |
| 2001/0032140 A1 | 10/2001 | Hoffman |
| 2002/0054750 A1 | 5/2002 | Ficco |
| 2003/0028498 A1 | 2/2003 | Hayes-Roth |
| 2005/0060532 A1 | 3/2005 | Dorenbosch et al. |
| 2007/0074114 A1 | 3/2007 | Adjali et al. |
| 2007/0296604 A1 | 12/2007 | Koyata et al. |
| 2008/0244040 A1 | 10/2008 | Bhatia et al. |
| 2009/0002479 A1 | 1/2009 | Sangberg et al. |
| 2009/0221367 A1 | 9/2009 | Longley et al. |
| 2009/0299932 A1 | 12/2009 | Hodge et al. |
| 2010/0028846 A1 | 2/2010 | Cohen et al. |
| 2010/0100907 A1 | 4/2010 | Chang et al. |
| 2010/0100916 A1 | 4/2010 | Clayton et al. |
| 2010/0124275 A1 | 5/2010 | Yeh et al. |
| 2010/0146076 A1 | 6/2010 | Adriazola et al. |
| 2010/0185640 A1 | 7/2010 | Dettinger et al. |
| 2010/0205541 A1 | 8/2010 | Rapaport et al. |
| 2010/0281427 A1 | 11/2010 | Ghosh et al. |
| 2010/0302055 A1 | 12/2010 | Yaguchi |
| 2011/0004481 A1 | 1/2011 | Jones et al. |
| 2011/0029889 A1 | 2/2011 | Karstens |
| 2011/0078578 A1 | 3/2011 | Calis |
| 2011/0093598 A1 | 4/2011 | Baratz et al. |
| 2011/0125770 A1 | 5/2011 | Battestini et al. |
| 2011/0282673 A1 | 11/2011 | Di Profio et al. |
| 2011/0288818 A1 | 11/2011 | Thierman et al. |
| 2012/0054333 A1 | 3/2012 | Vichare et al. |
| 2012/0058747 A1 | 3/2012 | Yiannios et al. |
| 2012/0078997 A1 | 3/2012 | Evans et al. |
| 2012/0110625 A1 | 5/2012 | Bae et al. |
| 2012/0149308 A1 | 6/2012 | Rothkopf |
| 2012/0214461 A1 | 8/2012 | Raghavan et al. |
| 2012/0290977 A1 | 11/2012 | Devecka |
| 2013/0013727 A1 | 1/2013 | Walker |
| 2013/0054701 A1 | 2/2013 | Leeder et al. |
| 2013/0151602 A1 | 6/2013 | McClelland et al. |
| 2013/0162677 A1 | 6/2013 | Maaradji et al. |
| 2013/0167196 A1 | 6/2013 | Spencer et al. |
| 2013/0185412 A1 | 7/2013 | Orr et al. |
| 2013/0185442 A1 | 7/2013 | Siegel et al. |
| 2013/0191213 A1 | 7/2013 | Beck et al. |
| 2013/0198374 A1 | 8/2013 | Zalmanovitch et al. |
| 2013/0198816 A1 | 8/2013 | Bohli et al. |
| 2013/0222519 A1 | 8/2013 | Lee et al. |
| 2014/0064123 A1 | 3/2014 | Kim |
| 2014/0071807 A1 | 3/2014 | Tohzaka et al. |
| 2014/0073300 A1 | 3/2014 | Leeder et al. |
| 2014/0096590 A1 | 4/2014 | Amin et al. |
| 2014/0115463 A1 | 4/2014 | Reznor et al. |
| 2014/0164558 A1 | 6/2014 | Moon et al. |
| 2014/0344806 A1 | 11/2014 | Suresh |
| 2015/0037771 A1 | 2/2015 | Carbone, Jr. et al. |
| 2015/0199122 A1 | 7/2015 | Garmark |
| 2017/0193684 A1 | 7/2017 | Du et al. |
| 2017/0206795 A1 | 7/2017 | Kaleal, III et al. |
| 2019/0259067 A1 | 8/2019 | Baldwin |
| 2019/0364414 A1 | 11/2019 | Baldwin |
| 2023/0014321 A1* | 1/2023 | Nair .......... G10L 25/51 |

FOREIGN PATENT DOCUMENTS

| | | |
|---|---|---|
| WO | 2012052582 A2 | 4/2012 |
| WO | 2014051457 A1 | 4/2014 |

OTHER PUBLICATIONS

Lieberman, H. et al., "Instructible agents: Software that just keeps getting better", IBM Systems Journal, vol. 35, Nos. 3 & 4, 1996, 539-556.

Lieberman, H. , "Out of context: Computer systems that adapt to, and Tearn from, context", IBM Systems Journal, 2000, 617-632.

Maes, Pattie , "Agents that Reduce Work and Information Overload", MIT Media Laboratory, 1994, 1-17.

Mitchell, Tom et al., "Experience With a Learning Personal Assistant", ACM, 1994, 1-18.

* cited by examiner

300

400

METHOD AND APPARATUS FOR ADJUSTING A DIGITAL ASSISTANT PERSONA

CROSS-REFERENCE TO RELATED APPLICATIONS

This application is a continuation of U.S. application Ser. No. 16/405,137, filed May 7, 2019, which is a continuation of U.S. application Ser. No. 14/076,306, filed Nov. 11, 2013 (now U.S. Pat. No. 10,311,482), which are incorporated herein by reference in their entirety.

FIELD OF THE DISCLOSURE

The subject disclosure relates to a method and apparatus for adjusting a digital assistant persona.

BACKGROUND

Communication devices can provide digital assistants which enable a user to engage in a communication exchange with the digital assistant. The digital assistants can provide various information to a user based on questions posed by the user, such as the name of a restaurant, sporting event scores, and so forth.

BRIEF DESCRIPTION OF THE DRAWINGS

Reference will now be made to the accompanying drawings, which are not necessarily drawn to scale, and wherein.

DETAILED DESCRIPTION

Figure 1:
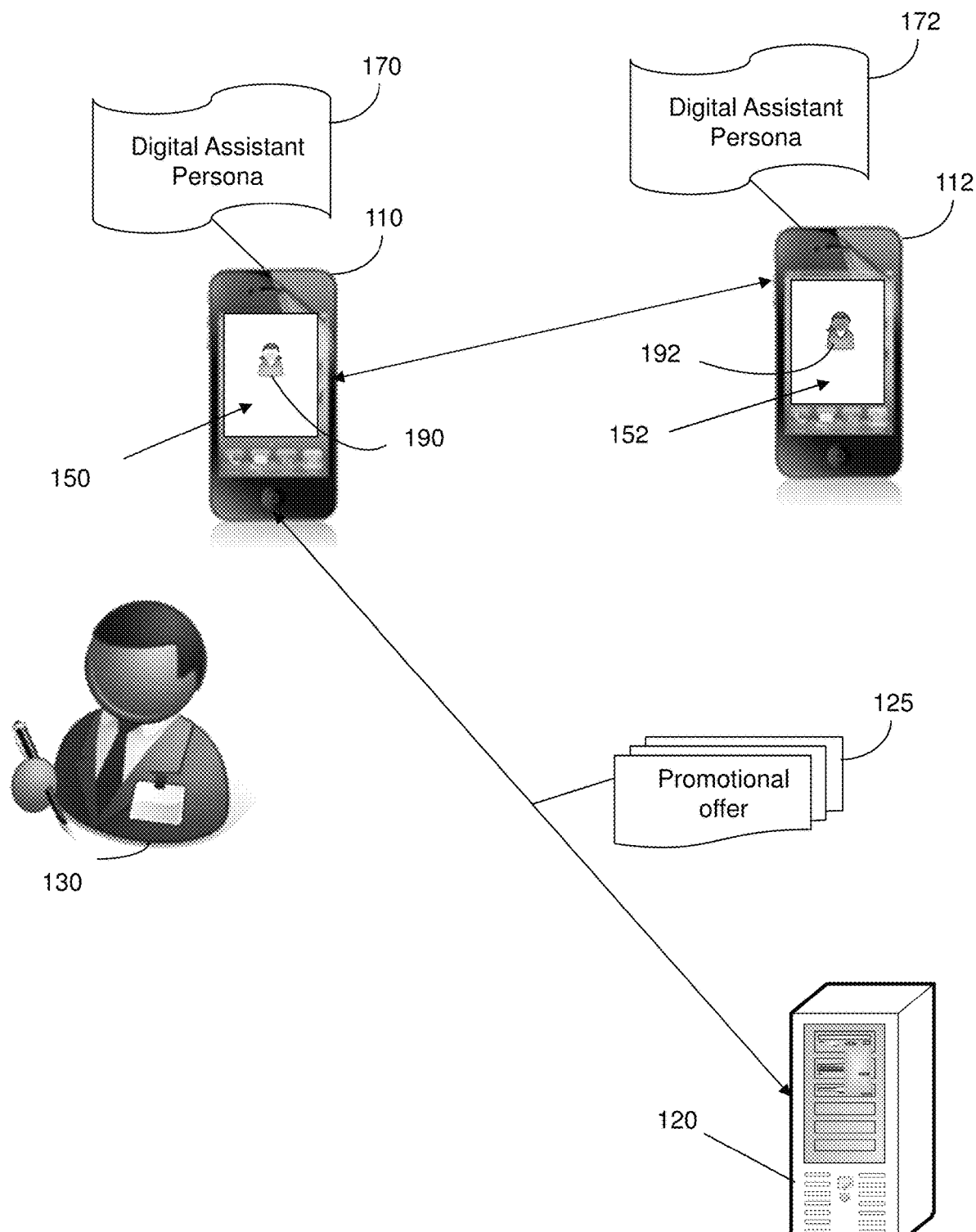
FIG. 1 depicts an illustrative embodiment of a communication system including a communication device executing a digital assistant that enables digital assistant persona adjustments.

The subject disclosure describes, among other things, illustrative embodiments for enabling one or more digital assistant personas to be adapted based on various factors, including a determined user persona of the user, a determined user deficiency of the user, promotional offers from a marketing entity, and/or interaction with other digital assistants of other devices. The exemplary embodiments enable utilizing cues taken from the user and/or the environment for adaptation of a digital assistant persona of a digital assistant. In one embodiment, a digital assistant persona can adapt in response to the personas of other users' digital assistants (which may or may not be nearby), as well as more local intelligent digital assistants (e.g., for a house, a banquet hall, retail store, and so forth). In one embodiment, these digital assistants may act as a direct and/or indirect source of user information for advertisers.

In one embodiment, the digital assistant persona can be adjusted to control how much information and/or the type of information to share and/or with whom the selected information can be shared. In one or more embodiments, a system and method for adapting a digital assistant persona is provided based on numerous cues including direct user input, indirect user input (e.g. body language, vocal cues, language, and so forth), environmental input (e.g., location, other individuals, and so forth), other digital assistant personas, and so forth. In one or more embodiments, marketing techniques are provided for influencing digital assistants to enable more effective advertising and marketing.

Other embodiments are included in the subject disclosure.

One embodiment of the subject disclosure is a method, which can be performed by a first communication device and which can include providing a first digital assistant to engage in a first communication exchange with a user of the first communication device where the first digital assistant has a first digital assistant persona that controls information provided by the first digital assistant during communication exchanges, and analyzing user input during the first communication exchange. The method can include determining, by the first communication device, a user persona of the user based on the analyzing of the user input. The method can include receiving, by the first communication device, a promotional offer from a marketing system, where the promotional offer is based on a benefit being provided by the marketing system in exchange for presentation of marketing information by the first digital assistant. The method can include providing, by the first communication device, an acceptance of the promotional offer to the marketing system. The method can include adjusting, by the first communication device, the first digital assistant persona based on the user persona and the marketing information. The adjusting of the first digital assistant persona can cause the first digital assistant to present the marketing information in a response during the first communication exchange.

One embodiment of the subject disclosure includes a computer readable storage device comprising executable instructions which, responsive to being executed by a processor of a first communication device, cause the processor to perform operations including providing a first digital assistant to engage in a first communication exchange with a user of the first communication device, where the first digital assistant has a first digital assistant persona that controls information provided by the first digital assistant during communication exchanges. The processor can analyze user input during the first communication exchange and can determine a user deficiency based on the analyzing of the user input. The processor can provide an acceptance of a promotional offer to a marketing system, where the promotional offer is based on a benefit being provided by the marketing system in exchange for presentation of marketing information by the first digital assistant. The processor can adjust the first digital assistant persona based on the user deficiency and the marketing information. The adjusting of the first digital assistant persona can cause the first digital assistant to present the marketing information in a response during the first communication exchange. The adjusting of the first digital assistant persona can cause the first digital assistant to present deficiency information during the first communication exchange that is selected by the first digital assistant based on the user deficiency. The deficiency information can be associated with subject matter that is designated by the processor as being unknown to the user.

One embodiment of the subject disclosure includes a first communication device comprising a processor and a memory that stores executable instructions that, when executed by the processor, facilitate performance of operations that include providing a first digital assistant to engage in a first communication exchange with a user of the first communication device where the first digital assistant has a first digital assistant persona that controls information provided by the first digital assistant during communication exchanges. The processor can analyze user input during the first communication exchange and can determine a user persona of the user based on the analyzing of the user input. The processor can determine a user deficiency based on the analyzing of the user input, and can adjust the first digital assistant persona based on the user persona and the user deficiency. The adjusting of the first digital assistant persona can cause the first digital assistant to present deficiency information during the first communication exchange that is selected by the first digital assistant based on the user deficiency. The deficiency information can be associated with subject matter that is designated by the processor as being unknown to the user.

FIG. 1 depicts an illustrative embodiment of a communication system 100 that includes a communication device 110 and one or more other communication devices 112 (only one of which is illustrated). Various other devices that facilitate or otherwise enable communication between the devices 110, 112 such as a wireless and/or wired network are not shown, but one of ordinary skill in the art would understand that other components, including network elements (e.g., routers, switches, servers, wireless access points, base stations, femtocells and so forth) and customer premises equipment (e.g., gateways, modems, and so forth) can be used in system 100. The device 110 can be associated with a user 130 (or a group of users such as a family that shares the device). The device 112 can be associated with the user 130 (or a group of users such as a family that shares the device) or with another user (not shown) that may or may not be affiliated with the user 130. The user association can be in various forms such as a registered owner of the device, a registered user of the device, a guest user of the device and so forth. The devices 110, 112 can be various types of devices including one or more of mobile devices, laptop computers, desktop computers, tablets, media processors (e.g., a set top box), interactive televisions with internet capabilities, vehicle communication systems, and so forth. It should be understood that the devices 110, 112 can be any types of communication devices, although for purposes of the examples described herein, the devices will be described as a mobile device.

Each of the devices 110, 112 can have a digital assistant 150, 152, respectively. The digital assistants 150, 152 can each have a digital assistant persona 170, 172 which can control information that is provided by the digital assistants during communication exchanges. In one or more embodiment, the control by the digital assistant persona can be the policies or rules applied by the digital assistant with respect to obtaining information and/or presenting the information. In another embodiment, avatars 190, 192 can be provided by the digital assistants 150, 152 to facilitate the communication exchanges with users of the devices. The avatars 190, 192 can be of various type including avatars that are depicted to resemble the users or resemble someone according to user preferences.

In one embodiment, an intent and/or purpose of the digital assistant persona 170 (or other digital assistant personas of other digital assistants being presented by various devices) can control, or otherwise guide, much of the interactions with the user 130 and/or other digital assistants. The intent and/or purpose of the digital assistant persona 170 can vary from user to user. In one embodiment, the intent and/or purpose of the digital assistant persona 170 may develop or evolve as the needs or desires of the user 130 change over time (such as during the communication exchange or between different communication exchanges).

In one embodiment, the digital assistant persona 170 can be adjusted to mirror the user 130. For instance, the device 110 can adapt the digital assistant persona 170 to mimic that of user 130. This can include mimicking or otherwise presenting one or more of similar speech patterns, vocabulary, audio pitch, audio volume, and so forth. In this example, the device 110 can alter by detecting cues from the user 130, as the user's persona changes so can the digital assistant's persona change. In one embodiment, the digital persona 170 can be adjusted to complement the user. For example, a digital assistant might exhibit behavioral traits or moods that are opposite to or otherwise counter those of the user (e.g., a quiet, shy user might be provided with a more expressive digital assistant based on an adjustment to the digital assistant persona 170). In another embodiment, the digital assistant persona 170 can be adjusted so that the digital assistant, via control over information being presented, can focus on those aspects of a situation with which the user is not as skilled which allows the user to focus on their strengths while letting the digital assistant aid the user in capturing, analyzing, and/or interpreting the other aspects of the situation. In another embodiment, the digital assistant persona 170 can be adapted to promote certain behaviors over others. For example, the digital assistant persona 170 can be adjusted so that the digital assistant 150 attempts to improve the user 130 through changes in the persona. For instance, the digital assistant 150 can provide information in an attempt to expand the vocabulary of the user 130 and/or teach the user 130 a new language through the words or language used in the information that is being rendered during the communication exchange between the user 130 and the digital assistant 150.

In one embodiment, the digital assistant persona 170 can be adjusted or otherwise influenced by incentives. For instance, the digital assistant 150 can promote certain activities (e.g., dining at a selected restaurant or eating selected food) over less healthy alternatives if the user 130 receives an incentive from an insurance provider in return. In one embodiment, the user 130 can allow entities (e.g., marketing systems) to influence the persona and/or decision making of the digital assistant 150 in exchange for compensation of some kind. For instance, in exchange for a certain level of influence over digital assistant 150, the user 130 can receive access to a service without advertisements. In this example, the user 130 can be provided with free access to an ad free service while also benefitting the influencing entity by providing the influencing entity with direct access to the user 130 with known personal information, some of which can be taken directly from the digital assistant 150. An example of this embodiment is illustrated by server 120 which can represent or otherwise be operated by a marketing system that can provide promotional offers 125 to the mobile device 110 and can receive acceptances from the mobile device 110 of one or more of the promotional offers.

In one embodiment, the advertising or marketing information can be applied to the digital assistant, such as interweaved into a communication exchange, so that the user may not perceive it as advertising. In one embodiment, the advertising or marketing information is provided by the digital assistant 150 as a response to a question being posed by the user 130.

In one embodiment, the digital assistant persona 170 can switch between two discrete states. In another embodiment, the digital assistant persona 170 can change by moving along a spectrum of potential states. For instance, differences between states along a spectrum might be nearly unnoticeable to a user or others. In one embodiment, changes in the digital assistant persona 170 might not be linked to a change in any single characteristic or state, but rather by several changes across several characteristics.

In one embodiment, the device 110 can utilize sensing, inference, and/or data capture, to provide information management and interaction control. For example, the amount and/or type of information being shared by the digital assistant 150 can vary depending on the intent and/or purpose of the digital assistant persona 170, as well as other information. Another factor in the amount and/or type of information being shared by the digital assistant 150 can be with whom the information is being shared. In one embodiment, the digital assistant 150 can interact with one or more other digital assistants (e.g., digital assistant 152). These other digital assistants can be associated with other users both nearby and/or at remote locations, with locations such as homes, restaurants, retail locations, and so forth. In one embodiment, these interactions can utilize similar information sharing and trust models (e.g., friendships and social networking) for determining how much information to share and with whom (e.g., friend/known vs. stranger).

Figure 2:
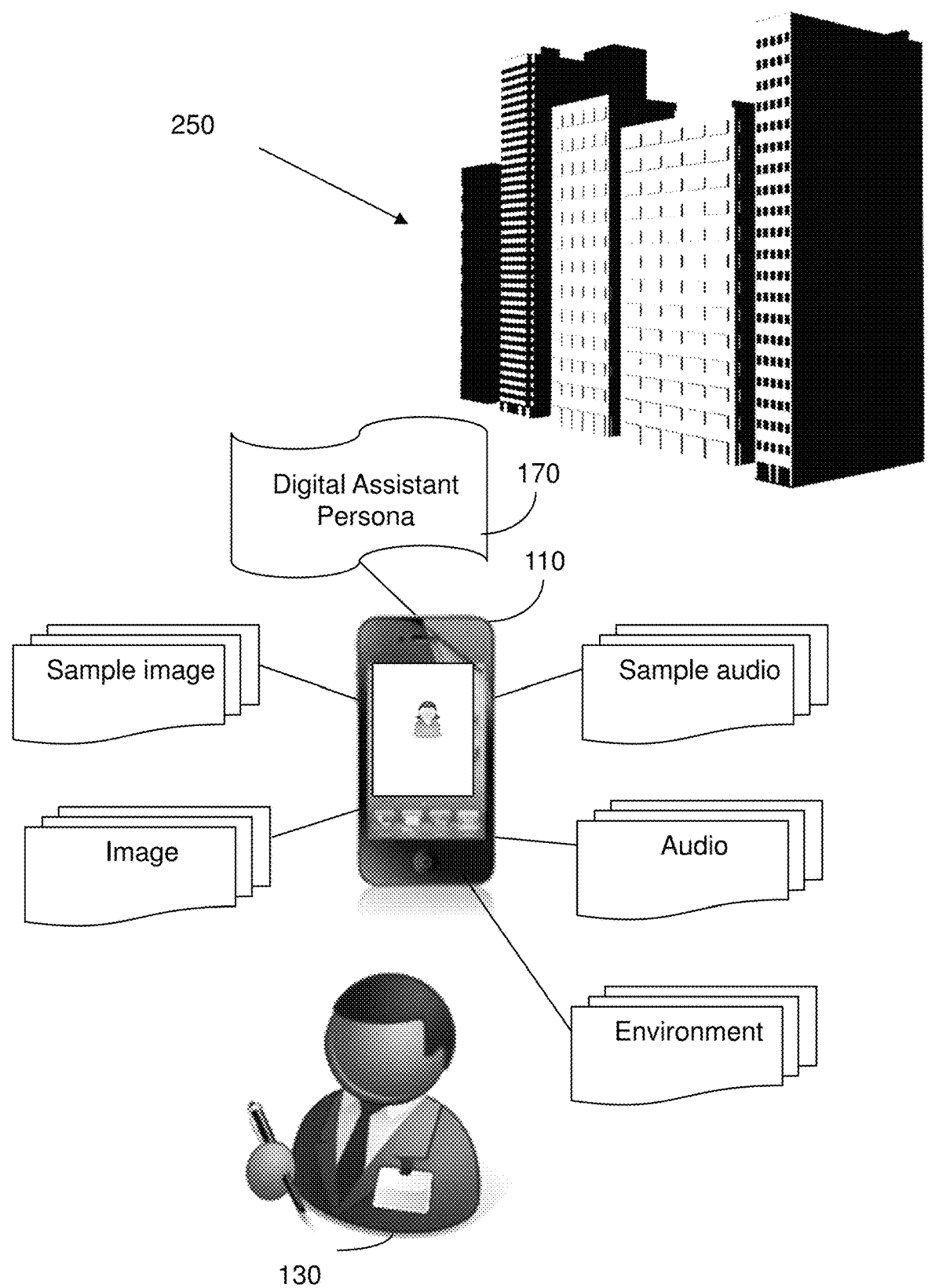
FIG. 2 depicts an illustrative embodiment of another communication system including the communication device of FIG. 1 that is located in an environment and where digital assistant persona adjustments are enabled.

FIG. 2 depicts an illustrative embodiment of a communication system 200 that includes the device 110. In one embodiment, the device 110 can capture an image of the user; compare the image to a sample image of the user (e.g., taken prior to the current communication exchange); and detect a physical cue or a change in physical traits of the user from the comparison. The detected physical cue or change in physical traits can be used to identify a behavioral trait of the user; and the user persona of the user can be determined based on the behavioral trait. This example can utilize the user persona as a factor in adjusting the digital assistant persona 170 of the digital assistant 150. In one embodiment, the sample image can be mapped to the context with which the sample was captured. For instance, the sample image can be from a previous communication exchange at a gym when the user was tired from exercising. This context can be considered as part of the comparison of the sample image with the current image. In one or more embodiments, the image can be a group of images to facilitate the comparison. In another embodiment, the group of images can be used to determine changes in physical gestures of the user, such as sample images (sample video content of the user) in which very little hand movements are seen as compared to currently captured images (current video of the user) in which a large amount of hand movements are detected. In this example, the change in hand movements can be used by the device 110 to detect that the user has entered a state of agitation. The detection of the state of agitation can be used to adjust the digital assistant persona, such as providing calming information as part of a communication exchange, or adjusting a format of the information to be more calming such as lowering the volume, softening the tones, and so forth.

In one embodiment, the device 110 can identify its location and can determine an environment 250 associated with the location. In this example, the adjusting of the digital assistant persona 170 can based on the environment 250, which in this example is illustrated as a city environment, but can be any type of environment, such as a restaurant, a library, a stadium, a park, a beach, a hospital, a school, a cemetery and so forth. Characteristics of the environment, such as quiet, somber, loud, energetic, and so forth, can be considered when adjusting the digital assistant persona 170, such as lowering volume for rendered audio information in a library environment, or selecting music to be played during a communication exchange that is more appropriate for the environment.

In one embodiment, the device 110 can obtain a sample of audio content of the user (which may be captured prior to the communication exchange such as from a previous communication exchange, voice call, and so forth). In this example, the audio content can be compared with the sample of audio content to identify a change in a user persona of the user, where the adjusting of the first digital assistant persona is based on the change in the user persona. In one embodiment, the sample of audio content can be mapped to the context with which the sample was captured. For instance, the sample of audio content can be from a previous communication exchange at a stadium when the user was energetic and loud. This context can be considered when performing the comparison of the sample of audio content with the current audio content, such as adjusting a persona to render louder audio information when it is detected that the communication device is presently in a similar context (e.g., at a race track).

Figure 3:
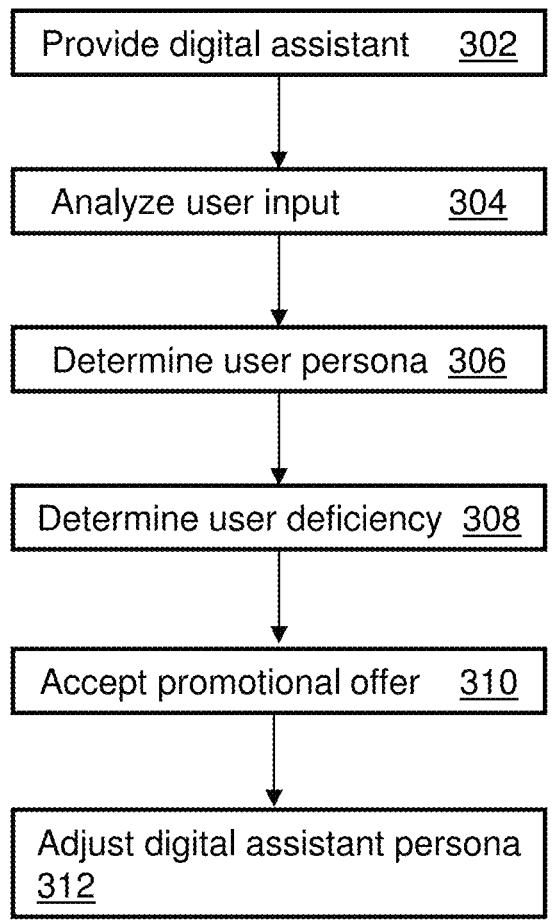
FIG. 3 depicts an illustrative embodiment of a method for digital assistant persona adjustment operating in portions of the system described in FIGS. 1 and 2.

FIG. 3 depicts an illustrative embodiment of a method 300 that can be used by one or more of the devices 110, 112 of FIGS. 1 and 2 to enable adjusting digital assistant personas. The particular order of the steps of the method 300 can be arranged, and the method 300 can be practiced utilizing more or less than all of the steps described herein. The method 300 can begin at 302 where a first communication device provides a first digital assistant to engage in a first communication exchange with a user of the first communication device. The first digital assistant can be presented or otherwise provided in various formats using various techniques, such as voice exchange, text exchange, and so forth. The first digital assistant can utilize an avatar to facilitate the communication exchange such as depicting the avatar as providing the information to the user during the communication exchange. The first digital assistant can have a first digital assistant persona that controls information provided by the first digital assistant during communication exchanges. The control of the information by the first digital assistant persona can include limiting the type of information that is rendered to the user, presenting the information in a particular language or utilizing selected vocabulary for presentation of the information. In one embodiment, the control of the information can include presenting the information in accordance with a mood or a behavioral trait, such as of the user. For instance, the information can be presented in a format that depicts enthusiasm or energy. In another example, the information can be presented in a format that depicts quiet or somber. The depiction of the mood or behavioral trait can be based on the selection of the vocabulary, color schemes, audio volume and/or pitch, sentence structure, and so forth. In one embodiment, the avatar can be adjusted, such as facial features, hand gestures, and so forth, to depict a mood or behavioral trait, such as of the user.

In another embodiment, the depiction of the mood or behavior trait can be in reaction to a detected mood or behavior of the user, such as to counter that mood or behavior trait. For instance, if it is detected that the user is in a somber mood then the first digital assistance persona can be adjusted so that the information is presented in a manner to counter the somber mood, such as interjecting humorous content into the information. In another example, if it is detected that the user is distracted or otherwise disinterested during the first communication exchange, then the first digital assistance persona can be adjusted so that the information is presented in a manner that is more interesting to the user. For instance, the user can be in a communication exchange with the digital assistant regarding facts concerning President Gerald Ford. The facts (i.e., the information in this example) presented by the digital assistant can include that President Ford was a football player for the University of Michigan which is more interesting to the user who is a sports fan. The inclusion of this particular fact in this example can result from a detected disinterest that caused an adjustment of the first digital assistance persona in a manner which was more interesting to the user.

At 304, user input can be analyzed by the first communication device during the first communication exchange. At 306, a determination can be made, by the first communication device, as to a user persona. The determination of the user persona can be based on the analyzing of the user input. At 308, a determination can be made, by the first communication device, as to a user deficiency. The determination of the user deficiency can be based on the analyzing of the user input. At 310, the first communication device can receive a promotional offer from a marketing system. In one embodiment, the promotional offer can be based on a benefit being provided by the marketing system in exchange for presentation of marketing information by the first digital assistant. The first communication device can provide an acceptance of the promotional offer to the marketing system. At 312, the first communication device can adjust the first digital assistant persona based on one or more of the user persona, the user deficiency, and the marketing information. In one embodiment, the adjusting of the first digital assistant persona can cause the first digital assistant to present the marketing information in a response during the first communication exchange.

In one embodiment, the analyzing of the user input includes an analysis of speech patterns and/or vocabulary, such as of audio content and/or text that is provided as user input by the user to the first communication device during the first communication exchange. The analysis can be performed utilizing various techniques, including speech recognition, natural language synthesis, and so forth. Various libraries, including local and/or remote libraries can be accessed to facilitate the analysis of the user input. In one embodiment, the adjusting of the first digital assistant persona causes the first digital assistant to present deficiency information during the first communication exchange that is selected by the first digital assistant based on the user deficiency. In another embodiment, the deficiency information is associated with a subject matter that is designated by the first communication device as being unknown to the user. This designation of being unknown can include various levels of lack of knowledge such as a complete lack of knowledge, an amount of knowledge that falls below a threshold and so forth. In one embodiment, the designation by the first communication device can be based on various factors, such as a user asserting untrue facts regarding a subject matter. In other embodiments, whether or not the user has some knowledge of subject matter may not negate the designation of the subject matter being unknown to the user.

In one embodiment, the first communication device can engage in a second communication exchange between the first digital assistant and a second digital assistant of a second communication device (e.g., device 112 of FIG. 1). In this example, the first communication device can determine a first level of trust to be applied to the second digital assistant. The first level of trust can be determined based on a number of factors, including based on a prior communication exchange between the first digital assistant and the second digital assistant (e.g., any information sharing limits that were previously applied, accuracy of previously received information, previous distribution of confidential information by the second digital assistant, and so forth) and/or based on a second level of trust being applied by the second digital assistant to the first digital assistant during the second communication exchange (e.g., determining information sharing limitations being imposed by the second digital assistant during the second communication exchange). In this example, the first and second levels of trust control information sharing between the first and second digital assistants, such as restricting the sharing of certain information. In one embodiment, the first communication device can adjust the first digital assistant persona based on the first level of trust. In one embodiment, the first digital assistant can present, during the first communication exchange, additional information obtained from the second communication exchange. In one or more embodiments, the second communication device can be associated with a second user, such as a family member or friend of the user, or the second communication device can be associated with an entity, such as a store, a restaurant, and so forth).

In one embodiment, the first communication device can capture an image of the user; detect a physical cue of the user from the image; and identify a behavioral trait of the user from the physical cue, where the determining of the user persona is based on the behavioral trait. In one embodiment, the first communication device can identify a location for the first communication device and can determine an environment associated with the location, where the adjusting of the first digital assistant persona is based on the environment.

In one embodiment, the adjusting of the first digital assistant persona may not be based on a user selection. In one embodiment, the user input can include audio content of the user captured at the first communication device during the first communication exchange. In one embodiment, the analyzing of the user input includes obtaining, by the first communication device, a sample of audio content of the user captured prior to the first communication exchange, and comparing, by the first communication device, the audio content with the sample of audio content to identify a change in the user persona.

In one embodiment, the first communication device can capture an image of the user; obtain a sample image of the user captured prior to the first communication exchange; and compare the image with the sample image to identify a change in a physical trait of the user, where the determining of the user persona is based on the change in the physical trait of the user. In one embodiment, the marketing information can be presented in the response as an answer to a question posed by the user during the first communication exchange.

In one or more embodiments, the adjustment of the first digital assistant persona can be in conjunction with adjustments of other digital assistant personas of other devices of the user, and/or can be in conjunction with adjustments of other device personas of other devices of the user. Examples of devices and techniques that can be utilized for adjusting multiple digital assistant personas of a user or adjusting the first digital assistant persona in conjunction with device personas of other devices of the user are described in U.S. patent application Ser. No. 14/056,088 filed Oct. 17, 2013, the disclosure of which is hereby incorporated by reference.

Figure 4:
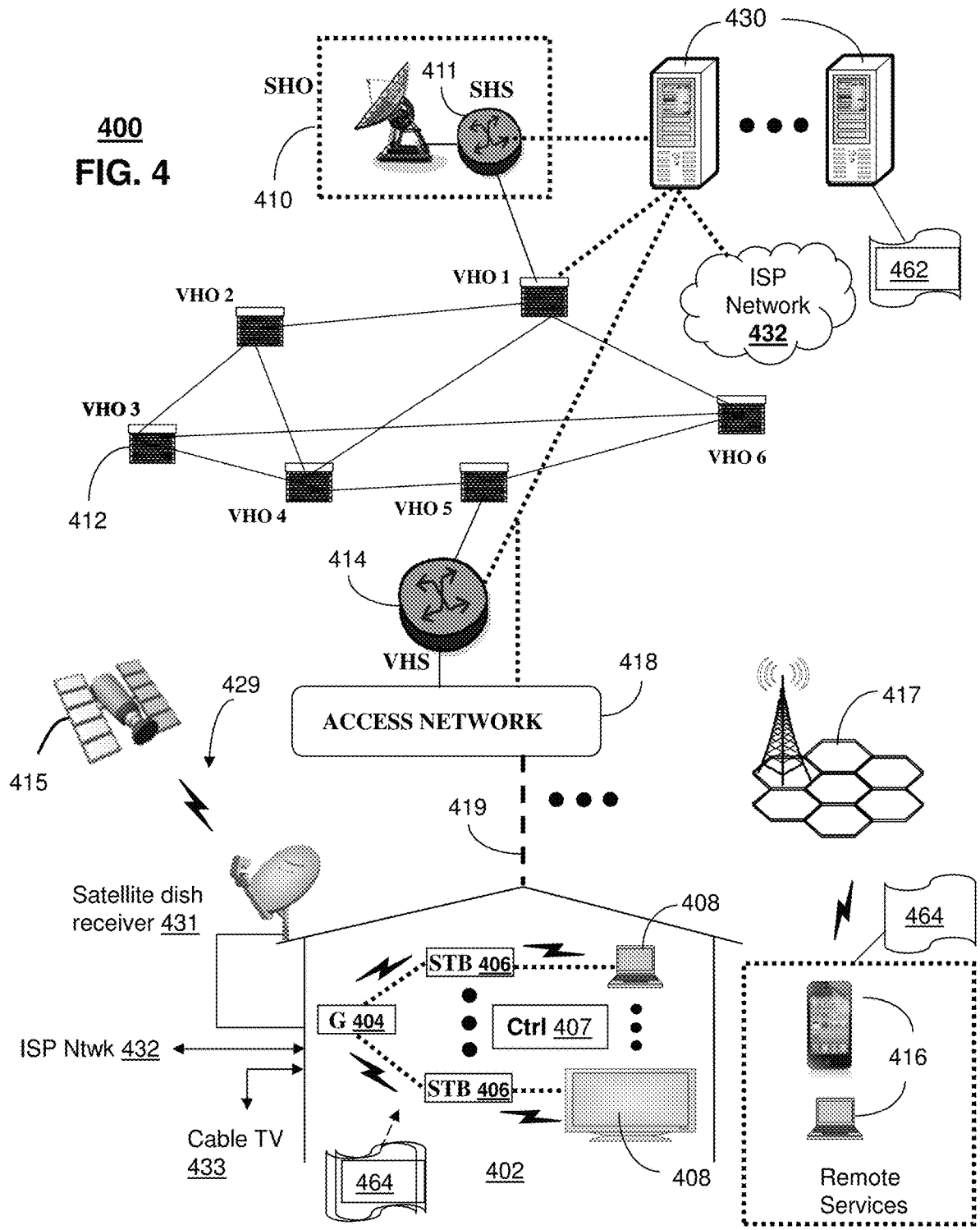
FIG. 4 depicts an illustrative embodiment of a communication system that provides media services including digital assistant persona adjustment.

FIG. 4 depicts an illustrative embodiment of a communication system 400 for delivering media content. The communication system 400 can represent an Internet Protocol Television (IPTV) media system. Communication system 400 can be overlaid or operably coupled with systems 100 and/or 200 of FIG. 1 and/or FIG. 2 as another representative embodiment of the communication system 400.

System 400 enables adjusting a digital assistant persona to control (e.g., the amount of, the type of, the format of) information provided by a digital assistant during a communication exchange with a user. The adjustment to the digital assistant persona can be based on various factors, such as changes to a user persona, detected user deficiencies (e.g., weak vocabulary, different native language, hearing impairment, visual impairment, cognitive disability, and so forth), promotional offers from marketing systems, interaction with other digital assistants, and so forth.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a marketing system or server or a network server (herein referred to as server 430). The server 430 can use computing and communication technology to perform function 462, which can include among other things, generating promotional offers and managing acceptances of those promotional offers by digital assistants; providing marketing information to be utilized (e.g., interwoven) during a communication exchange; providing incentives to the user based on the promotional offers and forth. In other embodiments, the server 430 can facilitate the adjustment of the digital assistant persona, such as remotely performing: analysis of user input, detection of user persona, detection of user deficiency; image pattern recognition, speech pattern recognition, and so forth. In one embodiment, the server 430 can monitor interaction between digital assistants to determine levels of trust being employed by the digital assistants. In this example, a notice indicating the levels of trust can be provided to one or all of the digital assistants that are interactive with each other. The server 430 can perform some or all of the digital assistant persona adjustments described above with respect to systems 100 and 200 and method 300.

The media processors (e.g., set top box) 406 and wireless communication devices 416 can be provisioned with software function 464 to perform one or more of: providing a digital assistant to engage in a communication exchange with a user where the digital assistant has a digital assistant persona that controls information provided by the digital assistant during communication exchanges; analyzing user input during the communication exchange; determining a user deficiency based on the analyzing of the user input; providing an acceptance of a promotional offer to a marketing system where the promotional offer is based on a benefit being provided by the marketing system in exchange for presentation of marketing information by the digital assistant; and adjusting the first digital assistant persona based on the user deficiency and the marketing information, where the adjusting of the first digital assistant persona causes the first digital assistant to present the marketing information in a response during the first communication exchange, where the adjusting of the first digital assistant persona causes the first digital assistant to present deficiency information during the first communication exchange that is selected by the first digital assistant based on the user deficiency, and where the deficiency information is associated with a subject matter that is determined by the processor to be unknown to the user. Function 464 can also include determining a user persona of the user based on the analyzing of the user input, where the adjusting of the first digital assistant persona is based on the user persona, and where the analyzing of the user input includes an analysis of speech patterns and vocabulary.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
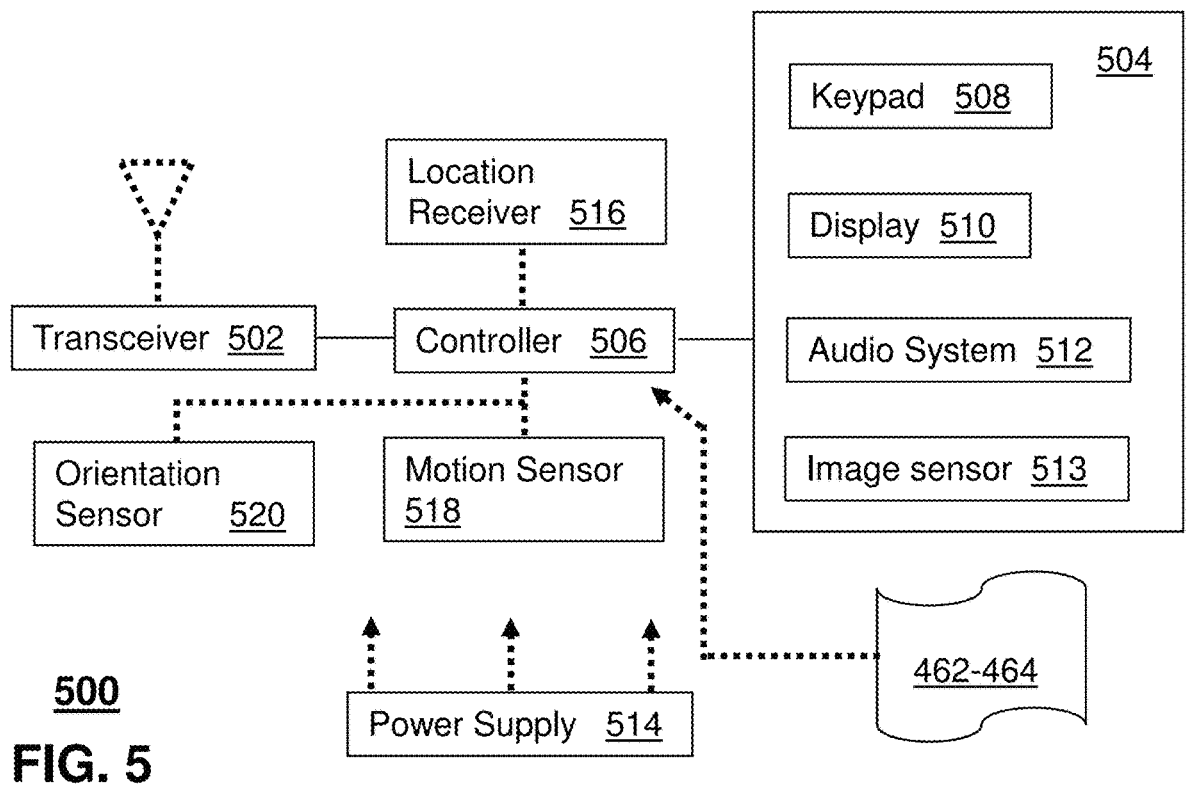
FIG. 5 depicts an illustrative embodiment of a communication device that can adjust its own digital assistant persona.

FIG. 5 depicts an illustrative embodiment of a communication device 500. Communication device 500 can serve in whole or in part as an illustrative embodiment of the devices depicted in FIGS. 1-2 and 4. Device 500 can provide a digital assistant to engage in a communication exchange with a user of the communication device where the digital assistant has a digital assistant persona that controls information provided by the digital assistant during communication exchanges. Device 500 can analyze user input during the communication exchange and can determine a user persona of the user based on the analyzing of the user input.

In one embodiment, the device 500 can provide an acceptance of a promotional offer to a marketing system. The promotional offer can be based on a benefit being provided by the marketing system in exchange for presentation of marketing information by the first digital assistant. The adjusting of the digital assistant persona can cause the digital assistant to present the marketing information in a response during the communication exchange. The analyzing of the user input can include an analysis of speech patterns and vocabulary. In one embodiment, the device 500 can engage in a second communication exchange between the digital assistant and a second digital assistant of a second communication device. The device 500 can determine a first level of trust to be applied to the second digital assistant, where the first level of trust is determined based on a prior communication exchange between the digital assistant and the second digital assistant and based on a second level of trust being applied by the second digital assistant to the digital assistant during the second communication exchange, where the first and second levels of trust control information sharing between the digital assistant and the second digital assistant. The device 500 can adjust the digital assistant persona based on the first level of trust. The device 500 can present, via the digital assistant during the communication exchange, additional information obtained from the second communication exchange.

In one embodiment, device 500 can determine a user deficiency based on the analyzing of the user input and can adjust the first digital assistant persona based on the user persona and the user deficiency. The adjusting of the digital assistant persona can cause the digital assistant to present deficiency information during the communication exchange that is selected by the digital assistant based on the user deficiency and/or the deficiency information can be associated with a subject matter that is designated by the processor as being unknown to the user.

To enable these digital assistant persona adjusting features, communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the media processor 406, the media devices 408, the portable communication devices 416 of FIG. 4, the marketing system or server 430 and so forth. It will be appreciated that the communication device 500 can also represent other devices that can operate in communication system 400 of FIG. 4 such as a gaming console and a media player.

The communication device 500 shown in FIG. 5 or portions thereof can serve as a representation of one or more of the devices of systems 100 and/or 200 of FIGS. 1 and/or 2, and/or communication system 400. In addition, the controller 506 can be adapted in various embodiments to perform the functions 462-464 in order to adjust a digital assistant persona based on various factors such as user persona changes, environments, analysis of user input received during a communication exchange, promotional offers directed to the user, communication exchanges with other devices/user/digital assistants, and so forth.

Upon reviewing the aforementioned embodiments, it would be evident to an artisan with ordinary skill in the art that said embodiments can be modified, reduced, or enhanced without departing from the scope of the claims described below. For example, digital assistant persona adjustments can be made based on network status information. For instance, the mobile device 110 may limit the information being prepared where accessibility to information sources has been limited due to a network condition (e.g., a failure of one or more network elements).

In one embodiment, the levels of trust can be based on trust model that are generated and adjusted between digital assistants based on multiple communication exchanges between the digital assistants. The trust models can take into account user relationships, historical interactions, subject matter of the interactions, and so forth.

In one embodiment, the adjustment of digital assistant persona is not limited to end user devices and can include other customer premises equipment associated with the user. For example, a residential gateway can have a digital assistant with its own persona which is adjusted based on presence information, operational capability information, usage profiles and/or state information associated with one or more other devices and/or other digital assistants of the user. For example, all or some of this data can be analyzed to determine how the particular device should be utilized, such as in conjunction with how other devices of the user should be utilized.

In one embodiment, the trust models being applied to control or otherwise influence the sharing of information by the digital assistant(s) can be trust models associated with various entities, such as one or more other users, one or more other communication devices, and/or one or more other digital assistants. As an example, a second communication exchange can occur between the first digital assistant and a second communication device; and a first level of trust to be applied during the second communication exchange can be determined, where the first level of trust is determined based on at least one of a prior communication exchange between the first digital assistant and the second communication device or based on a second level of trust being applied by the second communication device to the first digital assistant during the second communication exchange, where the first and second levels of trust control information sharing between the first digital assistant and the second communication device, and where the first level of trust is associated with at least one of a second user of the second communication device or a second digital assistant of the second communication device. Continuing with this example, the first digital assistant persona can be adjusted based on the first level of trust; and additional information can be presented, via the first digital assistant during the first communication exchange, where the additional information is obtained from the second communication exchange.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
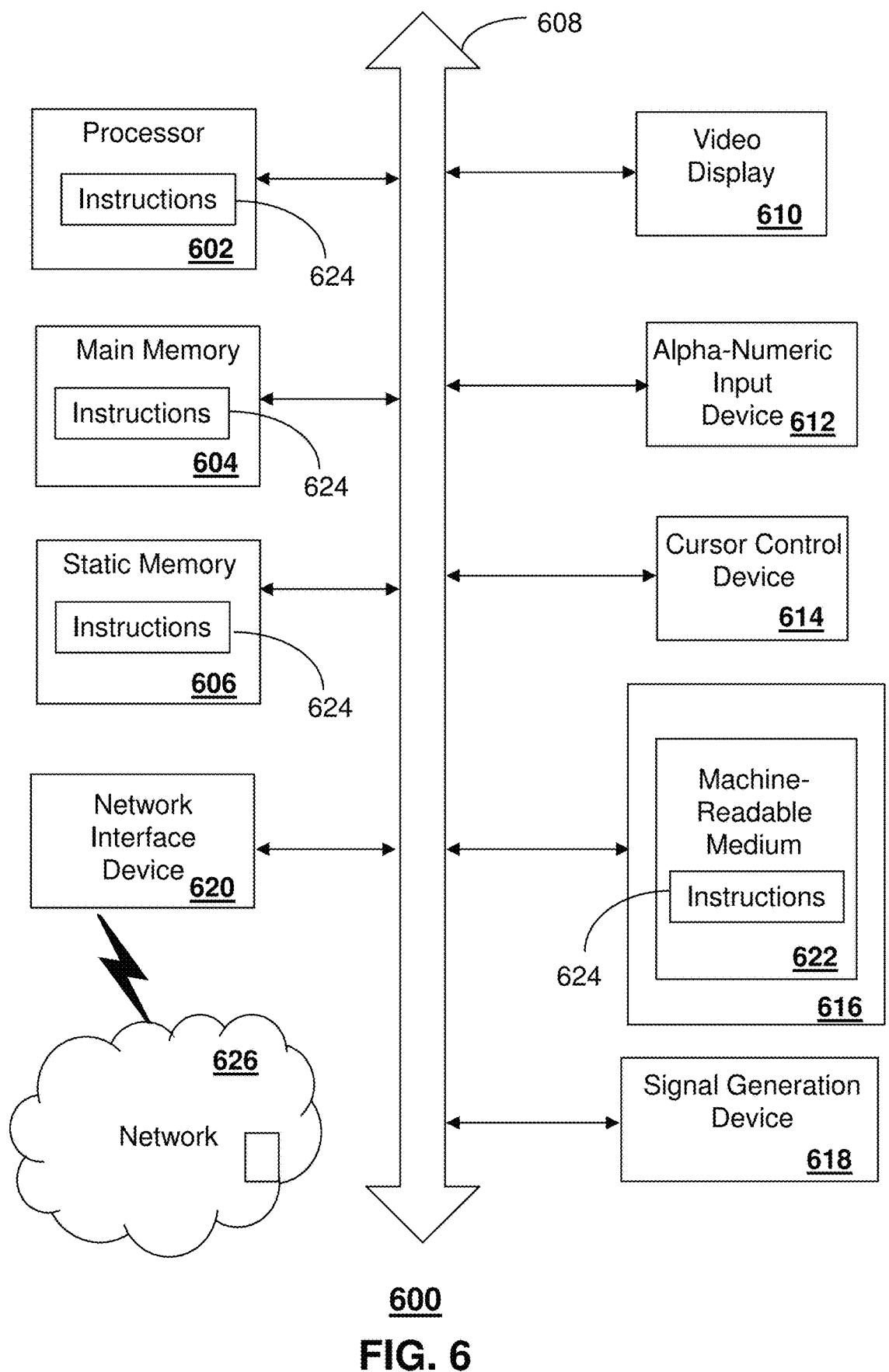
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods describe above. One or more instances of the machine can operate, for example, as the devices 110, 112, the system 120, the server 430, the media processor 406, the wireless devices 416 and other devices described herein. The machine can perform digital assistant persona adjustments based on the various information described herein including user persona, user deficiency, promotional offers, behavioral trait analysis, audio content analysis, image analysis and so forth. The machine can also engage in the sharing or providing of the various information described above. In some embodiments, the machine may be connected (e.g., using a network 626) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can include virtual processor(s). The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
providing a digital assistant to engage in a communication exchange with a user of a communication device, wherein the digital assistant has a digital assistant persona that controls obtaining and presenting information provided by the digital assistant during the communication exchange;
obtaining user input during the communication exchange, wherein the obtaining the user input comprises capturing an image of the user resulting in a captured image;
analyzing the user input, wherein the analyzing the user input includes analyzing speech patterns and vocabulary of the user and identifying a behavioral trait of the user, the identifying the behavioral trait based on detecting a physical cue from a comparison of the captured image with a sample image of the user;
determining a user deficiency based on the analyzing; and
adjusting the digital assistant persona based on the user deficiency, resulting in an adjusted persona, wherein the adjusting the digital assistant persona enables the digital assistant to present information during the communication exchange that is selected by the digital assistant based on the user deficiency, wherein the information is associated with a subject matter that is designated by the processing system as being unknown to the user, wherein the adjusted persona attempts to address the user deficiency by providing the information in the communication exchange.

2. The device of claim 1, wherein the operations further comprise presenting an avatar to facilitate the communication exchange.

3. The device of claim 2, wherein the avatar is presented in accordance with the adjusted persona.

4. The device of claim 1, wherein the adjusted persona attempts to improve the vocabulary of the user by words or language used in the communication exchange.

5. The device of claim 1, wherein the information provided in the communication exchange comprises an incentive offered to the user.

6. The device of claim 5, wherein the incentive comprises a promotional offer provided by a marketing system in communication with the processing system.

7. The device of claim 1, wherein the operations further comprise determining a user persona based on the analyzing the user input.

8. The device of claim 7, wherein the information provided in the communication exchange comprises marketing information.

9. The device of claim 8, wherein the adjusting the digital assistant persona is based on the user persona, the user deficiency, the marketing information, or a combination thereof.

10. A method comprising:
providing, by a processing system including a processor, a digital assistant to engage in a communication exchange with a user of a communication device, wherein the digital assistant has a digital assistant persona that controls obtaining and presenting information provided by the digital assistant during the communication exchange;
obtaining, by the processing system, user input during the communication exchange, wherein the obtaining the user input comprises capturing an image of the user resulting in a captured image;
analyzing, by the processing system, the user input, wherein the analyzing the user input includes analyzing speech patterns and vocabulary of the user and identifying a behavioral trait of the user, the identifying the behavioral trait based on detecting a physical cue from a comparison of the captured image with a sample image of the user;
determining, by the processing system, a user deficiency based on the analyzing; and
adjusting, by the processing system, the digital assistant persona based on the user deficiency, resulting in an adjusted persona, wherein the adjusting the digital assistant persona enables the digital assistant to present information during the communication exchange that is selected by the digital assistant based on the user deficiency, wherein the adjusted persona attempts to address the user deficiency by providing the information in the communication exchange.

11. The method of claim 10, wherein the information is associated with a subject matter that is designated by the processing system as being unknown to the user.

12. The method of claim 10, further comprising presenting, by the processing system, an avatar to facilitate the communication exchange.

13. The method of claim 10, wherein the adjusted persona attempts to improve the vocabulary of the user by words or language used in the communication exchange.

14. The method of claim 10, wherein the information provided in the communication exchange comprises an incentive offered to the user.

15. The method of claim 10, further comprising determining, by the processing system, a user persona based on the analyzing the user input.

16. A non-transitory machine-readable medium comprising executable instructions that, when executed by a processing system including a processor, facilitate performance of operations comprising:
providing a digital assistant to engage in a communication exchange with a user of a communication device, wherein the digital assistant has a digital assistant persona that controls obtaining and presenting information provided by the digital assistant during the communication exchange;
obtaining user input during the communication exchange, wherein the obtaining the user input comprises capturing an image of the user resulting in a captured image;
analyzing the user input, wherein the analyzing the user input includes analyzing speech patterns and vocabulary of the user and identifying a behavioral trait of the user, the identifying the behavioral trait based on detecting a physical cue from a comparison of the captured image with a sample image of the user;
determining a user persona based on the analyzing the user input;
determining a user deficiency based on the analyzing; and
adjusting the digital assistant persona based on the user deficiency, resulting in an adjusted persona, wherein the adjusting the digital assistant persona enables the digital assistant to present information during the communication exchange that is selected by the digital assistant based on the user deficiency, wherein the adjusted persona attempts to address the user deficiency by providing the information in the communication exchange.

17. The non-transitory machine-readable medium of claim 16, wherein the information is associated with a subject matter that is designated by the processing system as being unknown to the user.

18. The non-transitory machine-readable medium of claim 16, wherein the operations further comprise presenting an avatar to facilitate the communication exchange.

19. The non-transitory machine-readable medium of claim 16, wherein the adjusted persona attempts to improve the vocabulary of the user by words or language used in the communication exchange.

20. The non-transitory machine-readable medium of claim 16, wherein the information provided in the communication exchange comprises an incentive offered to the user.

* * * * *